Dec. 20, 1966    P. G. BIRD ETAL    3,292,650
WATER TREATMENT AND MAKE-UP CONTROL SYSTEM
Filed Oct. 1, 1963
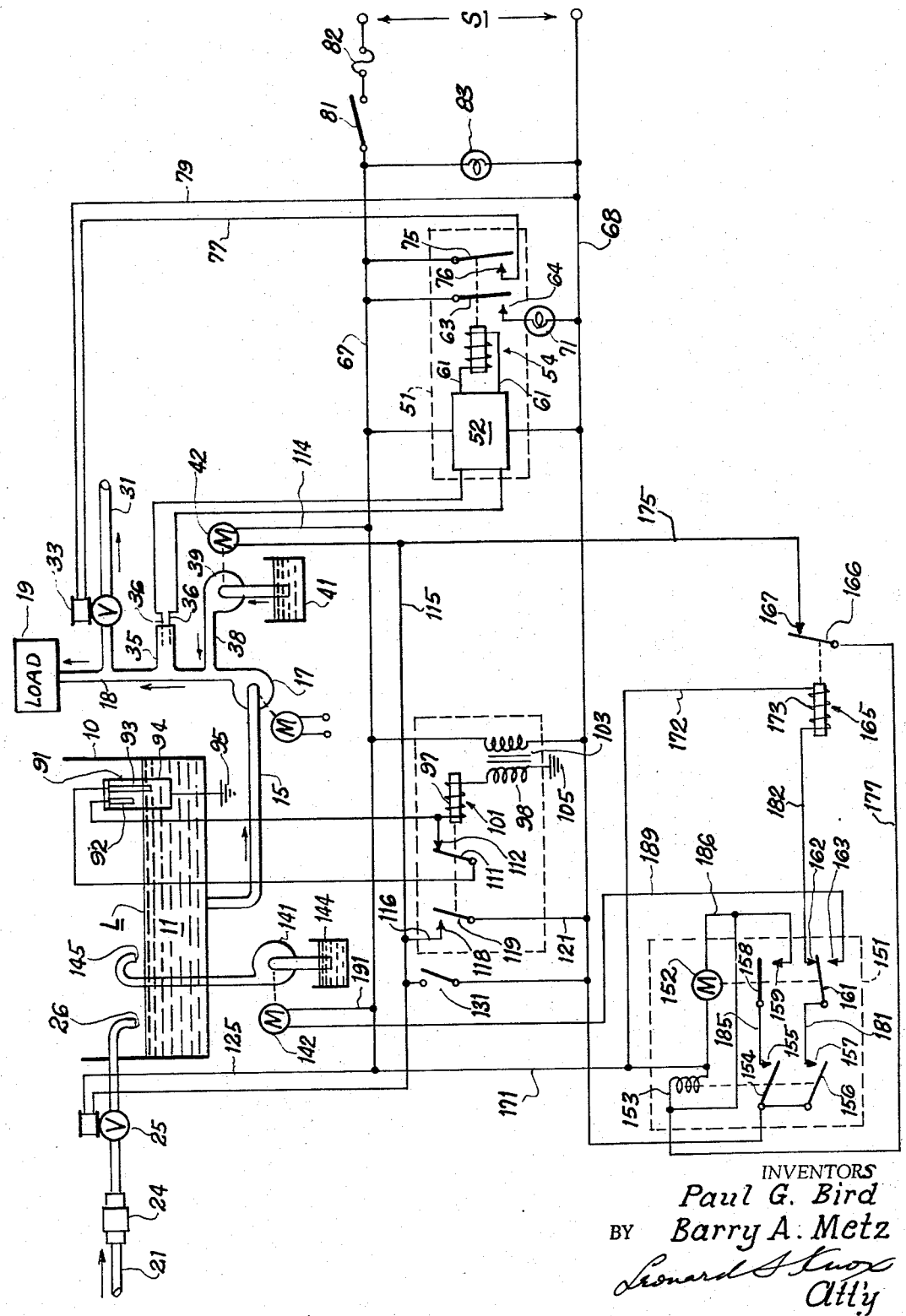
INVENTORS
Paul G. Bird
BY Barry A. Metz
Leonard S. Knox
Att'y

United States Patent Office

3,292,650
Patented Dec. 20, 1966

3,292,650
WATER TREATMENT AND MAKE-UP
CONTROL SYSTEM
Paul G. Bird, Wheaton, and Barry A. Metz, Skokie, Ill.,
assignors to Wright Chemical Corporation, Chicago,
Ill.
Filed Oct. 1, 1963, Ser. No. 313,090
5 Claims. (Cl. 137—93)

This invention relates to an automatic system for adding treatment chemicals to water and for controlling the concentration of such chemicals present in the water.

Where the water used in many types of industrial equipment is to be treated in accordance with the generally accepted standards of the industry, such as for hardness, inhibition of corrosion, scale, fungi, algae and other adverse elements present in the water, it is generally the practice to use mechanical feeders to deliver the treating chemicals. These are frequently controlled by automatic devices which regulate the rate of feed of the chemicals under the control of, or as indicated by the concentration of the mineral solids present in the water.

The present invention relates to improvements in apparatus of the foregoing general class which is furnished as a "package," thereby facilitating installation at the site, and which may be furnished in a basic form to perform the function of regulating the feed of the treatment chemicals and in more elaborate forms to perform additional functions, such as controlling the level of the basin water level, whereby treatment may be most advantageously accomplished. In another aspect, the invention contemplates the use of timing equipment for accurately controlling the period of time and the beginning point thereof during which certain functions may be realized.

The invention system, including components thereof constituting the same, is applicable to virtually any equipment wherein treated water is essential to successful performance, for example, air-conditioning and cooling equipment and industrial refrigeration. These several components may, for purposes of the present specification be considered as controlling the solids concentration, make-up water, basin water level and chemical feed as employed, for example, in a cooling tower system.

Other objects and advantages of the invention will become apparent from the ensuing description which, taken with the accompanying drawing, discloses a preferred mode of carrying the several aspects of the invention into practice.

The single figure is a schematic showing of the invention as incorporated with a water supply and a make-up basin together with portions of the associated piping of typical equipment with which the invention may be incorporated.

Broadly regarded, the invention, in one aspect, comprises apparatus for detecting the concentration of mineral solids in the circulating water and, by controlling the level of water in the basin, reducing the concentration of the mineral solids. The apparatus includes means for automatically feeding the treatment chemicals to the water during blowdown and, when a tolerable concentration is reached, then blow-down is interrupted. As the level in the basin reaches a predetermined maximum, feed of make-up water and treatment chemicals is interrupted. In a further aspect, the valves, preferably solenoid valves, are of a type and are so arranged in the system as to "fail safe," so that in case of emergency the tower associated with circulation of the water, as in the case of systems wherein cooling of the water is an essential step, will not overflow or drain. In general, the components of the system are of such nature that installation can be effected with a minimal degree of alteration in the existing piping.

Reverting to the drawing, there is shown a reservoir 10, usually termed a basin, containing some predetermined volume of water 11 having a variable level $L$. Treated water is removed from the basin 10 through a conduit 15 connected to the inlet side of a motor-driven pump 17, the discharge side whereof is connected to a conduit 18 to feed the make-up water to a load 19, such as a cooling tower, condenser or the like. The pump 17 is manually or automatically controlled in accordance with the demands of the load.

Fresh water to make up the losses in the system is introduced into the basin 10 through a pipe 21, there being a device 24 of any well-known type for regulating the rate of flow and a solenoid-operated valve 25 to initiate and interrupt flow in accordance with signals fed thereto by other portions of the system to be detailed subsequently. The pipe 21 has an exit 26 which may be above or below the level $L$.

To reduce the concentration of solids in the water 11 in the basin there is a blowdown line 31 forming a branch of the load line 18 and capable of being opened and closed by a solenoid valve 33. This latter is controlled automatically by means to be described. Discharge from the line 31 is usually to a sewer.

A branch fitting 35 is inserted in the line 18 and is arranged to form a closed chamber wherein the electrodes 36 of a conductivity cell are positioned. Such cells are commercially available and are so constituted as to translate the conductivity of the water flowing in the line 18 into a usable voltage. Devices capable of the stated use are obtainable from Industrial Instruments, Inc., Cedar Grove, New Jersey, and are shown and described in their Catalog No. 23.

Conduit 18 has another branch 38 connected to the discharge side of a motor-driven pump 39, having its intake in communication with a receptacle 41 containing a supply of chemicals with which the water flowing through the conduit 18 is to be treated. The motor 42 driving the pump 39 is under the control of automatic means now to be described.

Such means, referred to herein as a treatment and make-up controller, is indicated generally at 51 and includes a circuit 52 shown as a box, capable of translating the voltage determined at the electrodes 36 into an output voltage to actuate a relay 54. For example, the circuit 52 may include a form of Wheatstone bridge in which one leg is the variable resistance between the electrodes 36 and the output voltage is seen across the conductors 61. Such variable resistance will be a function of the conductivity of the water in the chamber 35, viz. the line 18.

At this juncture it is to be noted that where, in this specification, the word "water" is employed, it is to be construed either as raw water, as supplied at the conduit 21, or as treated water, viz. raw water plus added treatment chemicals, as the context may require.

The electrodes 36—36 and the associated circuitry will be so constructed and arranged as to provide an output signal at 61—61 when the conductivity of the water being delivered to the load reaches some established maximum. By providing for adjustment of one or more of the resistances in the bridge circuit such point of response may be readily established in accordance with well-known principles. Assuming that the concentration of mineral solids dissolved or suspended in the treated water being delivered to the load has an acceptable conductivity, the relay 54 will be de-energized and its armature 63 and back contact 64 will maintain in open condition the circuit from one side 67 of the supply voltages, through a red pilot lamp 71 to the other side thereof whereby to indicate to the operator, by absence of red illumination, that the concentration is below the maximum tolerance. On the other hand, if the conductivity exceeds such maximum the relay is energized to complete two circuits: one, through the lamp 71 to indicate that treatment is called for, and two, from line 67, through armature 75, contact 76, conductor 77, operating coil of solenoid valve 33, line 79 to the other side 68 of the supply.

The main source S of operating voltage has the customary on-off main switch 81, fuse 82 and pilot light 83.

With the energization of valve 33, the blowdown line 31 is opened and water is bled from the load line 18 and delivered to the sewer. Concurrently the level L will be dropping and is availed of to supply additional make-up water by means and in a manner now to be detailed.

A liquid level sensor 91 having a pair of electrically-conductive probes is installed as shown in the drawing namely, with the shorter probe 92 arranged to sense the upper limit of the level L and the longer probe 93 to sense the lower limit of the level L. The casing 94 enclosing the probes 92 and 93 is also conductive and is connected to ground at 95. The probes are insulated from each other and from the casing 94. The probe 92 is connected to one side of the winding 97 of a relay 101 and the other side of the winding is connected to the secondary 98 of a step-up transformer 103, the other side of the secondary being connected to ground at 105. By stepping up the voltage the current is reduced to a safe level. As long as the level L is at an acceptable maximum a circuit is completed from ground 95, through casing 94, body of water 11, probe 92, winding 97, secondary 98, to ground 105 and the relay remains energized. As the water level recedes due, in minor degree to normal evaporation but mainly as a result of blowdown, the relay 101 remains energized by virtue of a holding circuit which may be traced from ground 95, through casing 94, body of water 11, probe 93, armature 111, contact 112, winding 97 and secondary 98 to ground 105. When the level L reaches its minimum allowable value, the probe 93 is exposed and the holding circuit which was maintained therethrough is broken, dropping out the relay 101 and closing a circuit as follows: from line 67, through motor 42 to conductor 115, branch 116, relay contact 118, armature 119, which are now closed, conductor 121 to line 68, whereupon the pump 39 delivers treatment chemicals from the receptacle 41 into the load line 18 and the relay 54 opens.

The manual switch 131 is in parallel with the contact 118 and armature 119 and is used in an emergency should the relay 101 or its associated components fail to function.

As just mentioned, opening of the relay 101 applies line 68 to conductor 115 so that another circuit may be traced from line 68, over conductor 121, armature 119, contact 118, which are now closed, branch 116, conductor 115, operating coil of solenoid valve 25, conductor 125 to line 67, whereby the valve opens and water is added to the basin 10 until probe 92 is immersed to re-establish the circuit therethrough previously described, whereupon relay 101 pulls in to break the circuit through contact 118 and armature 119 to de-energize the valve 25 and to interrupt flow therethrough.

Recapitulating, when the level L is such that both probes 92 and 93 are immersed relay 101 is energized and contact 112 and armature 111 are closed. When the level L drops below the probe 93 the relay is deenergized and 111 and 112 are open and 118 and 119 are closed thereby to operate the pump 39 and open the valve 25. Thus the water will rise to immerse the probe 92 and the relay 101 will pull in to stop the pump 39 and close the valve 25. As shown in the drawing i.e. with the level L between the two probes no water is needed.

To control the conductivity of the water in the basin 10 there is provided apparatus now to be described.

A pump 141 driven by a motor 142 has its intake in communication with a supply of acid in a receptacle 144 and its discharge 145 arranged to deliver the same to the body of water 11. The kind or kinds of acid are those generally employed in water treatment and, since numerous variations thereof are possible and well-known, elucidation will be avoided. Assuming a pump 141 of some predetermined rate of delivery, timing means are employed to initiate and interrupt feed of the acid. To this end, a timer 151 generally indicated in broken lines is utilized. One commercial form of timer suitable for the purpose has a motor 152 and an operating coil 153 arranged to actuate certain sets of contacts 154–155, 156–157, 158–159 and 161–162–163. These contacts are shown in the de-activated condition of the timer. There is also a relay 165 having a winding 173, an armature 166, and a normally-closed back contact 167.

A circuit may be traced as follows: from power line 67 over conductor 171 to one side of the timer operating coil 153 and to one side of the timer motor 152 and, via a branch 172, to one side of the winding 173 of the relay 165. The conductor 175 connects with the conductor 115 so that when armature 119 is closed on its contact 118, the power line 68 is connected to conductor 115 and therefore to the back contact 167 of the relay 165. Thence, the circuit continues through the armature 166, conductor 177 to the other side of the timer operating coil 153 and of the timer motor 152. As soon as the timer coil 153 is energized, the contacts 156–157 are closed to complete a circuit to the winding 173 of the relay 165 as follows: from line 68, closed contacts 156–157, conductor 181, closed contacts 161–162, conductor 182 to energize relay 165 which thereby opens the circuit previously established through armature 166 and contact 167. However, the timer motor 152 continues to run by virtue of a holding circuit which may be traced from line 68 through contacts 154–155, conductor 185, contacts 158–159 (now closed through rotation of the motor 152) and conductor 186. When the motor 152 has started the contacts 161–163 close to establish a circuit to the acid pump motor 142 as follows: line 68, contacts 156–157, conductor 181, contacts 161–163, line 189, motor 142, conductor 191 to the other side of the line, 67. The pump will continue to run for some period which may be preset on the timer by well-known means provided therein for that purpose. At the end of the period, the motor 152 will stop and the several sets of contacts controlled thereby, and inclosed in the rectangle 151, will be restored to their respective normal positions shown in the drawing, thereby interrupting the circuit to the motor 142 and terminating flow of acid to the basin 10.

While we have shown a particular embodiment of our invention, it will be understood of course, that we do not wish to be limited thereto since many modifications may be made and we, therefore, contemplate that the appended claims cover such modifications as may fall within the true spirit and scope of our invention.

We claim:

1. In a water-treating system which comprises a basin containing a supply of water of variable level, a pipe connected to a main adapted to replenish the supply, a pump, conduit means connecting the supply to the suction side of the pump, a load to which water is to be transferred from the basin, second conduit means connecting the load to the discharge side of the pump, the combination comprising: a supply of treating chemicals, electric-motor-driven pressuring means to deliver chemicals from the chemical supply into said second conduit means, means responsive to the level of the water supply, said level-responsive means comprising a switch to detect maximum level and a switch to detect minimum level, a relay having a winding to be energized through the medium of said level-responsive means when the maximum level obtains and to be de-energized when said level departs from the maximum, a holding circuit including a current source, said minimum level switch, a set of holding contacts forming part of the relay and one end of the relay winding to maintain the relay energized notwithstanding departure of the level from said maximum, said minimum level detecting switch, when opened by the level reaching its minimum, breaking said holding circuit, a second set of contacts controlled by said relay adapted to open and close a circuit from one side of the current source, a solenoid-operated valve in the replenishing pipe, one side of the valve being connected to the other side of the current source, one side of the electric motor being connected to said one side of the current source, the other side of the electric motor and solenoid valve being connected through said second set of contacts to the other side of the current source whereby replenishment of water and feed of chemicals occurs concurrently.

2. In a water-treating system which comprises a basin containing a supply of water of variable level, a pipe connected to a main adapted to replenish the supply, a pump, first conduit means connecting the supply to the suction side of the pump, a load to which water is to be transferred from the basin, second conduit means connecting the load to the discharge side of the pump, the combination comprising: a second pump driven by an electric motor, a supply of water-treating chemicals, the intake side of said second pump being in communication with the chemical supply, the discharge side of said second pump being connected to said second conduit means to deliver chemicals thereto, means for detecting the concentration of chemicals in the water delivered to the load, a relay, means responsive to said detecting means to operate said relay, said relay having a pair of contacts, one of which is connected to a source of power, a blow-down branch from said second conduit means to a point of waste disposal, a normally-closed solenoid-operated valve in said blowdown line, said solenoid being in series with the other relay contact and the other side of the power source, whereby closing of said relay contacts in response to an over-treated condition of the water being delivered to the load will open said valve and, upon restoration of a normal, treated condition, said relay contacts will open and the solenoid valve close.

3. In a water-treating system which comprises a basin containing a supply of water of variable level, a pipe connected to a main adapted to replenish the supply, a first pump, first conduit means connecting the suply tpo the suction side of said pump, a load to which water is to be delivered from the basin, second conduit means connecting the load to the discharge side of said pump, the combination comprising: a device responsive to rising and falling level of basin water, first valve means to control the delivery of water from the main to the basin, first relay means under the control of said device to open said valve means when said level falls to a predetermined low level and to close said valve means when said level rises to a predetermined high level, a supply of water-treating chemicals, means to deliver chemicals from the chemical supply to the second conduit means, means connecting said first relay means to said chemical delivering means to deliver chemicals concurrently with open condition of said first valve means, a blow-down branch connected to said second conduit means, second valve means in said branch, electrical probe means responsive to the concentration of chemicals in the water flowing from the basin to the load, second relay means, an electrical circuit including said probe means, second relay means, blow-down valve means and a source of power whereby said blow-down valve means is opened for blow-down when said concentration exceeds a pre-set value and is closed when said concentration drops to said value.

4. The combination in accordance with claim 3 further characterized in that said electrical circuit includes an electrical bridge to which said probe means is connected to unbalance the bridge in one sense or the other to provide a corresponding change in the output voltage of the bridge, said second relay means being connected to the output side of the bridge.

5. The combination in accordance with claim 3 further characterized by the provision of timing means, circuit means connecting said first relay means to said timing means when said first relay means is energized, a supply of acid, third pump means to deliver acid from said acid supply to the water in the basin, said third pump means being under the control of said timing means whereby, after a predetermined amount of acid has been delivered, said timing means terminates its cycle to stop said third pump means and interrupt delivery of acid.

References Cited by the Examiner

UNITED STATES PATENTS

| 2,221,306 | 11/1940 | Christle _____ 137—93 XR |
| 2,819,726 | 1/1958 | Rendel _____ 137—93 |
| 3,131,710 | 5/1964 | Ludwig et al. __ 137—101.25 XR |
| 3,170,479 | 2/1965 | Mueller _____ 137—392 |

ALAN COHAN, *Primary Examiner.*

WILLIAM F. O'DEA, *Examiner.*

D. ZOBKIW, *Assistant Examiner.*